June 3, 1952  J. B. FORKER  2,599,324
BEAM CUTTING METHOD
Filed April 15, 1949  3 Sheets-Sheet 1

INVENTOR.
J. BENTLY FORKER
BY
Bosworth & Sessions
ATTORNEYS.

June 3, 1952  J. B. FORKER  2,599,324
BEAM CUTTING METHOD
Filed April 15, 1949  3 Sheets-Sheet 3

INVENTOR.
J. BENTLY FORKER
BY Bosworth & Sessions
ATTORNEYS.

Patented June 3, 1952

2,599,324

UNITED STATES PATENT OFFICE 2,599,324

BEAM CUTTING METHOD

James Bently Forker, Shaker Heights, Ohio, assignor to The Forker Corporation, Cleveland, Ohio Application April 15, 1949, Serial No. 87,700

4 Claims. (Cl. 148—9)

1

This invention relates to methods of manufacturing rails from beams.

In the past, flame-cutting processes have been used in manufacturing metal rails from structural beams; i. e., H-beams, I-beams and the like. Such processes have employed torch carriages adapted to move or be moved from one end of the beam to the other, the torch or torches serving to cut away excess material from a flange or other integral part of the beam. Presumably because of localized heating effects necessarily involved in operations of this kind, the product so obtained has not been straight or substantially straight, as usually desired, but characterized by a marked concavity or upward bowing of its ends. This concavity makes necessary additional operations on the product such, for example, as mechanical straightening or spot-heating. The former introduces unwanted stresses and the latter tends to change the metallurgical character of the beam at a point or points where the spot-heating is done; consequently, neither is entirely satisfactory as a method of correcting the concavity.

The present invention has for its principal objects to obviate these and other difficulties, to that end providing methods by which the beam is subjected to and held during the cutting operation under pre-induced stress. This is done by introducing into the beam a predetermined arcuate deflection, and, with the beam held in place under the stresses thus developed, flame-cutting and quenching. Usually but not necessarily symmetrical in nature, such deflection is in a direction opposite to the concavity that would otherwise be obtained; i. e., the deflection is along the axis of the beam and of a character such as to give a temporary (or, if desired, a permanent) convexity or downward bowing of the ends as seen from the side.

Figure 1:
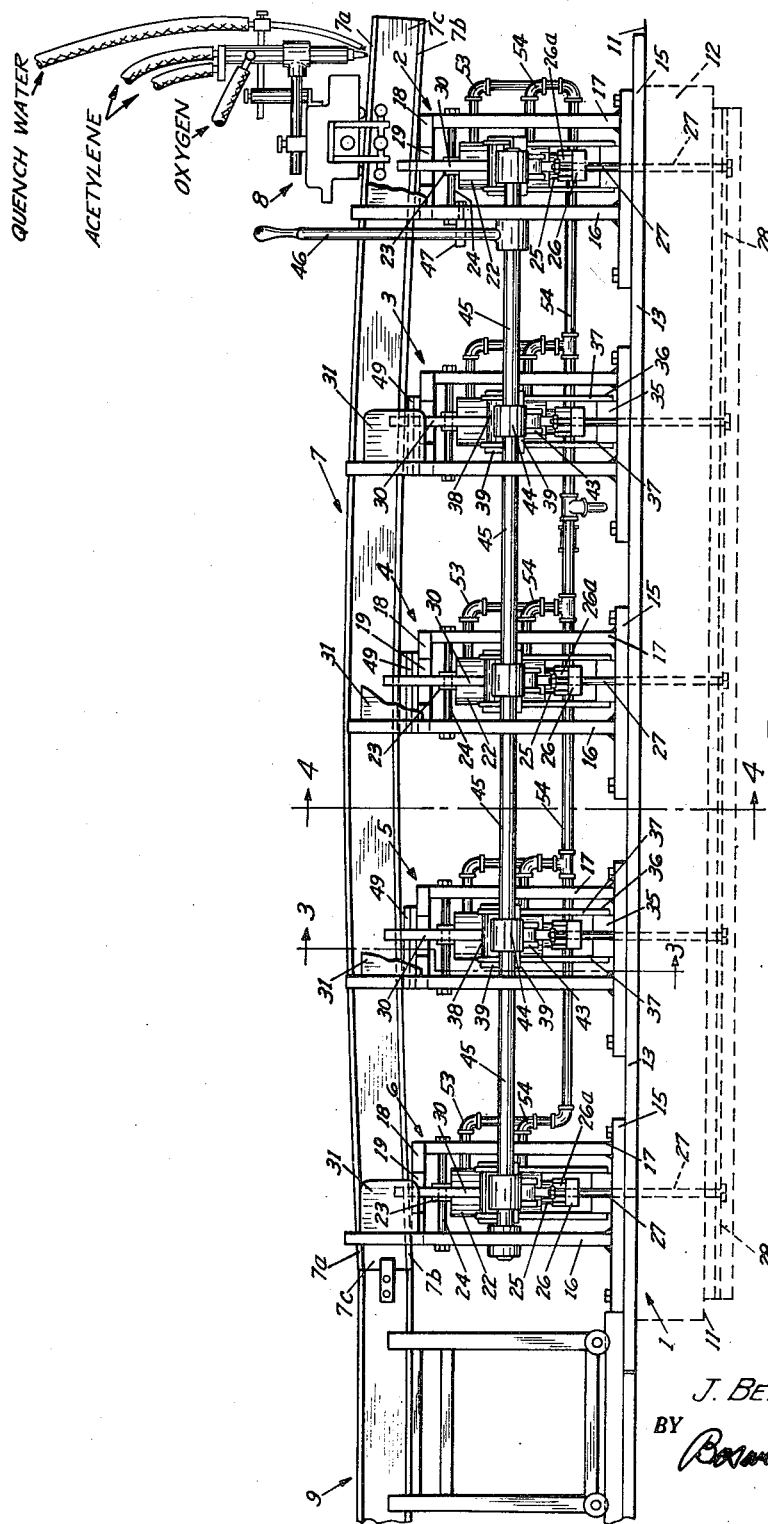
Figure 2:
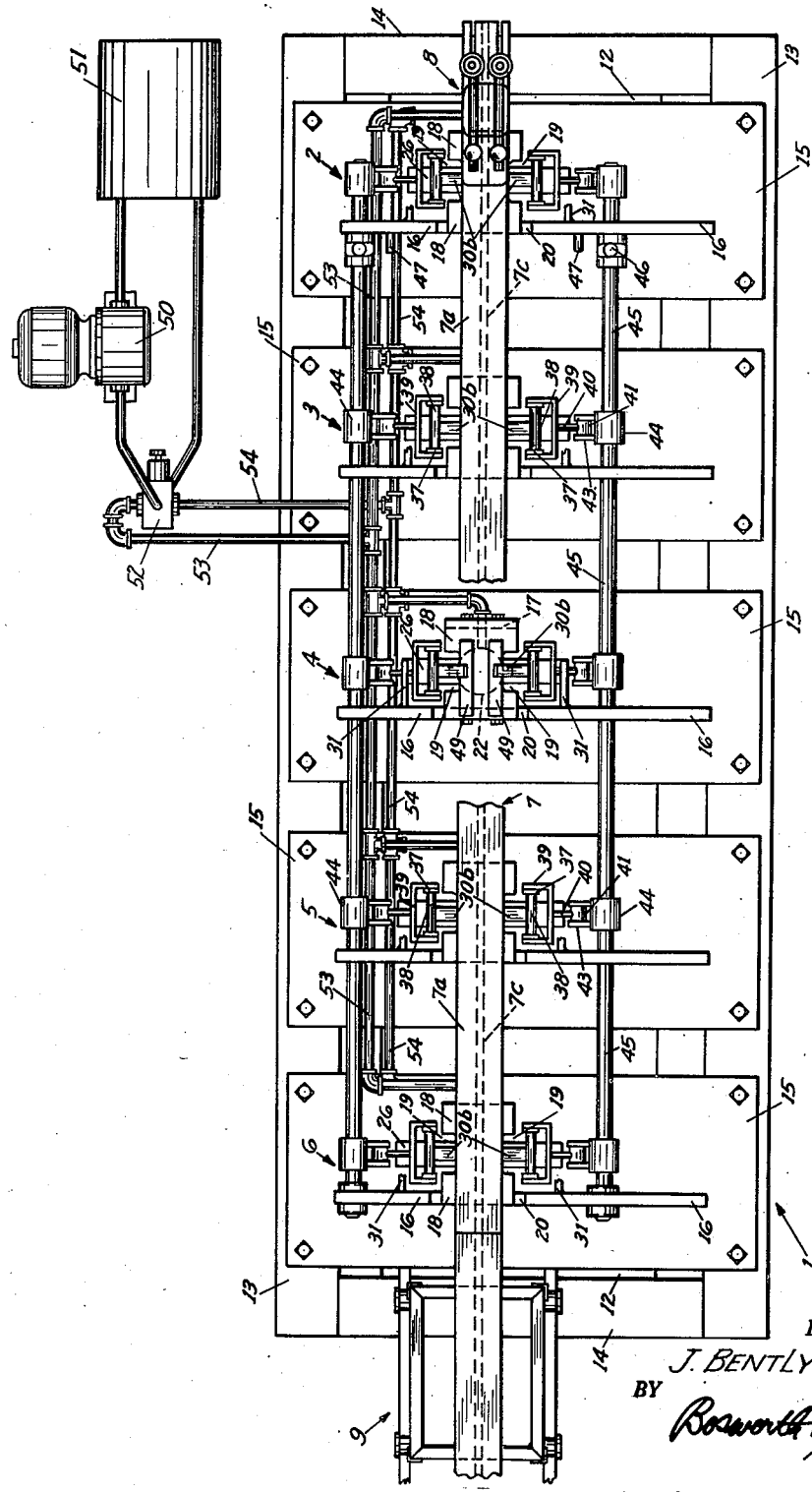
Figures 3, 4:
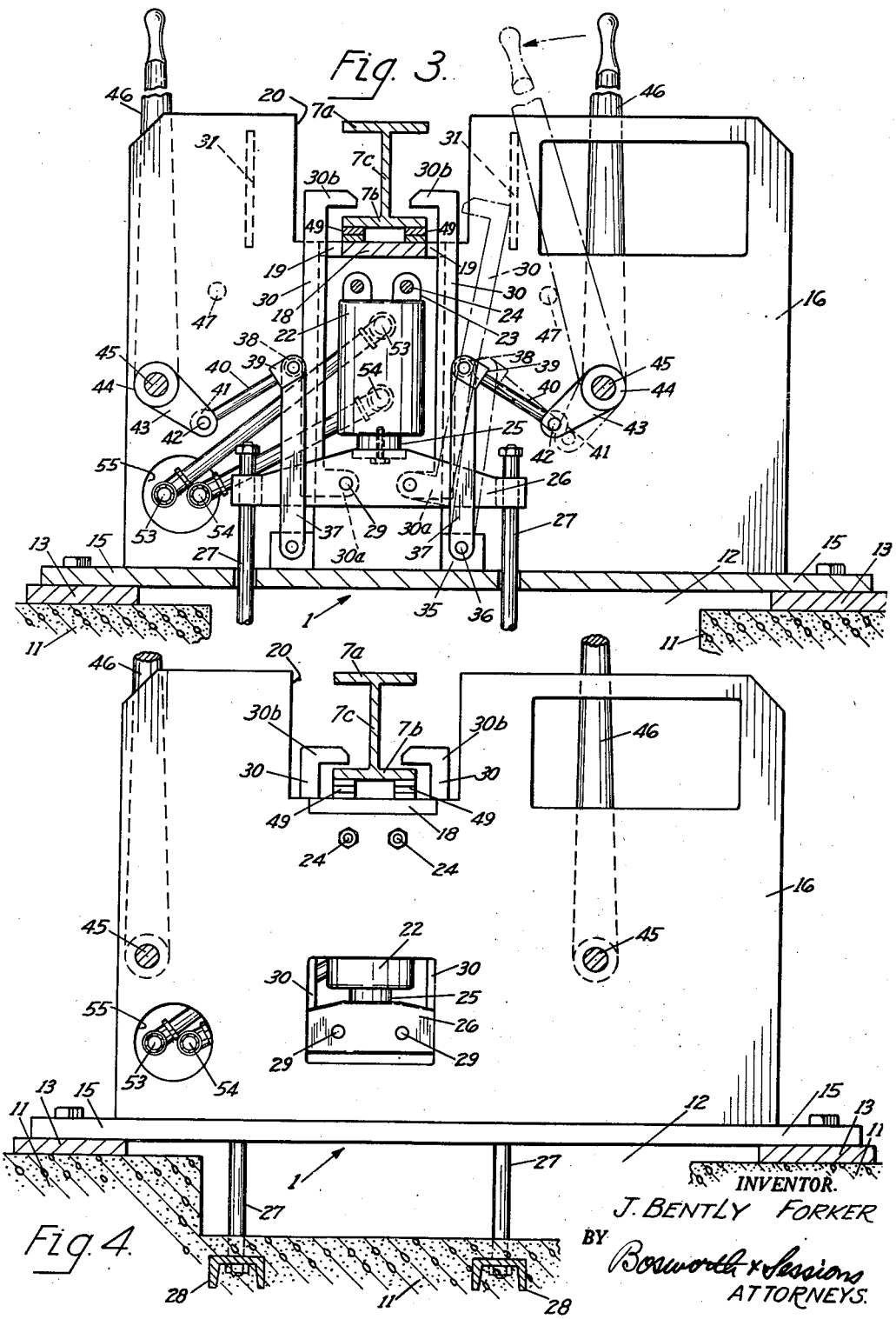

In its preferred form, the invention is illustrated in the accompanying drawings, in which Figure 1 represents a side elevation of apparatus which may be employed in practicing the invention. Figure 2 represents a corresponding top plan but with the beam being cut shown as broken away in order to reveal details of the middle one of the five stations. Figure 3 represents a view of the nature of a transverse section along line 3—3 of Figure 1, the same showing the parts in the position which they assume immediately before clamping pressure is applied. Figure 4 represents a corresponding view of the nature of a transverse section along line 4—4 of Figure 1, looking in the direction of the arrows; i. e., toward the middle station.

2

As indicated in Figure 1, the apparatus comprises, in general, a stand or frame 1, characterized by one or more stations that are preferably spaced laterally along such stand. The five stations shown in Figure 1 are designated 2 to 6, respectively, station 2 being the station at the extreme right-hand end of the stand, station 3 being the one at the right center, station 4 being the middle station, station 5 being the one at the left center, and station 6 being station at extreme left-hand end. Supported at each of the five stations is the beam 7 from which the rail is to be cut, such beam conveniently taking the form of an H-beam having a flat top flange 7a, a flat bottom flange 7b, and a web 7c connecting the top and bottom flanges.

Beam 7 is shown as carrying a torch carriage 8, the same appearing at the extreme right-hand end of Figures 1 and 2, and as abutting a run-off device 9 located at the extreme left-hand end of the apparatus. Torch carriage 8 can at minimum be of conventional construction, such, for example, as that shown in Anderson Patent No. 2,270,242, granted January 20, 1942, for Beam Cutting Machine, but may be elaborated in construction so long as it serves the purposes of a torch carriage. Run-off device 9 takes the form of a waist-high dolly mounted on tracks on which is carried a short length of beam similar in cross-section to beam 7, onto which torch carriage 8 moves after it has traversed beam 7 from the right-hand to the left-hand end thereof.

Stand 1 includes a concrete bed 11 indicated in dotted lines in Figure 1, the same having a pit 12 therein. It also includes two stringers or side pieces 13 mounted in or on bed 11, two pieces 14, and five cross plates 15, all of which are shown in Figure 2. Welded to cross plates 15 are five rigid standards, corresponding to stations 2 to 6, inclusive, consisting in each case of a wide vertical support plate 16, a narrow vertical support plate 17, and, extending between them, a work plate 18, which, as seen from above, has a laterally recessed or hour-glass outline. Lateral recesses 19 in work plates 18 appear to best advantage at station 4 in Figure 2. To accommodate work plates 18, wide support plates 16 have toward the top thereof stepped recesses 20 in the stepped or bottom portions of which recesses the work plates 18 are located and welded in place. In the apparatus illustrated in the drawings, there are five work plates 18, one for each of the five stations, each work plate forming part of a standard on which the beam to be cut can be placed.

As shown in Figures 3 and 4, a fluid pressure motor taking the form of a hydraulic cylinder 22 underlies each work plate 18, such cylinder being held in proper relation to the standard on which it is mounted by means of ears 23 on the upper end of the cylinder and cross bolts 24 passing horizontally through ears 23 from wide support plate 16 to narrow support plate 17. Within cylinder 22 is a piston (not shown) to which is affixed a ram 25. The latter is connected to and operates on a slotted cross head 26, the slot 26a in cross head 26 appearing in elevation in Figure 1.

As indicated in Figures 3 and 4, each cross head 26 is adapted to move up and down on vertical guide bolts 27, the lower ends of the latter being made fast to longitudinally extending trusses 28 embedded in the concrete of which bed 11 is formed. Spanning slots 26a in cross heads 26 are rods 29, each rod 29 passing through and being rigidly fixed in or to the side walls of cross head 26. Each cross head 26 carries in slot 26a thereof two pivotally mounted clamping arms 30, the same having at their lower ends ears 30a encompassing rods 29 and at their upper ends bent portions 30b, adapted, by virtue of the presence in work plates 18 of the lateral recesses 19, to overlie bottom flange 7b of beam 7.

As indicated in Figures 3 and 4, clamping rods 30 are in upright positions, shown in solid lines, immediately before clamping pressure is applied to them; however, they are adapted to move into the dotted line position in which they abut guards 31, which act as stops for the upper ends of clamping arms 30.

Cooperating with each of clamping arms 30 at each of the five stations, is a linkage system including a block 35 welded to cross plate 15, a pivot pin 36 in block 35, upwardly extending links 37 flanking block 35, there being two such links for each block, a cylindrical spacer 38 housing a pivot pin, a yoke 39, engaging the ends of the pivot pin in spacer 38, a rod 40 fastened to yoke 39 for movement therewith, and a sleeve 41 to which is fixed the opposite end of rod 40. Within sleeve 41 is a pin 42 (Figure 3) to the ends of which are operatively connected levers 43, one on each side of sleeve 41. Levers 43 are rigidly mounted on a collar 44 fixed to a shaft 45 extending lengthwise of the apparatus. The linkage system just described is the same at each of stations 2 to 6, inclusive, and is duplicated on opposite sides of stand 1.

Each shaft 45 is capable of limited rotation, clockwise or counterclockwise as the case may be, in response to a force imposed at the outer end of actuating lever 46, which, as indicated in Figures 1 and 3, abuts a stop 47 when moved toward beam 7.

With the parts in the positions shown in dotted lines in Figure 3; i. e., with clamping arms 30 in retracted position, levers 46 are moved away from beam 7, such movement being clockwise in the case of the lever shown at the right in Figure 3 and counterclockwise in the case of figure shown at the left of Figure 3. By bell-crank action, levers 43 move upward, clockwise or counterclockwise as the case may be, carrying with them pins 42, sleeves 41 and rods 40. In consequence, yokes 39 are moved inward, such movement producing corresponding movement in upwardly extending links 37 flanking blocks 35 and cross-heads 26. Clamping arms 30, which, by virtue of the fact that they are pivoted on pins 29, normally tend to fall into the dotted line position indicated in Figure 3, are thus forced into the upright position shown in full lines, in which bent portions 30b overlie flange 7b of beam 7.

With the parts in this relation, and after shims 49 have been inserted under beam 7 as hereinafter described, clamping pressure is applied to clamping arms 30. This is done by actuating a motor-driven gear pump 50, shown in Figure 2, which has associated therewith a reservoir 51 and a four-way valve 52. By means of pump 50, oil can be supplied through line 53 to the spaces above the pistons in cylinders 22; simultaneously, oil in the spaces below the piston can be withdrawn through line 54, being returned thereby to the reservoir 51. The effect of this action is to displace the pistons in cylinders 22 in a downward direction, and thus force downwardly rams 25, cross heads 26, and clamping arms 30. The latter, through bent portions 30b, engage and clamp flange 7b of beam 7 in place on work plates 18.

When, at a later stage, it is desired to release beam 7, valve 52 is reversed, causing pump 50 to force oil through line 54 to the spaces below the pistons in cylinders 22. At the same time, oil in the spaces above the pistons in cylinders 22 is exhausted through line 53 and returned to the reservoir 51 by means of pump 50, thus displacing the pistons in an upward direction. As shown in Figure 3, lines 53 and 54 connecting cylinders 22 and pump 50 are accommodated in holes 55 in wide support plates 16.

In preparing a beam for cutting, an H-beam, I-beam or other structural beam of suitable shape and dimensions is located on stand 1 with flange 7b in juxtaposition to the work plates 18 forming part of the standards at stations 2 to 6, inclusive. At this time (if not before) shims 49 are placed on work plates 18 in a position to underlie flange 7b of beam 7, shims in the intended maximum number being used at station 4. A lesser number of shims is used at adjacent stations 3 and 5. Three shims 49 appear in Figure 4, which shows the middle station, while two shims 49 appear in Figure 3, which shows adjacent station 5 but might equally well represent adjacent station 3.

In the installation shown in Figures 1 and 2, no shims are used at end stations 2 and 6, although in ordinary circumstances their presence at the end stations is often desirable (depending in part on the extent of overhang of the beam), helpful, or even necessary. If a beam is to be cut that does not have a flat bottom flange, it may be necessary to introduce shims at one but not the other of end stations 2 and 6, as well as at intermediate stations 3, 4 and 5. Generally, the maximum number of shims will be used at middle station 4 with a lesser number at stations 3 and 5, and some, but a still smaller number, at stations 2 and 6. In any event, where shims are used for the purposes described, the placing or insertion of the shims is effected before clamping pressure is applied to clamping arms 30.

The effect of placing or inserting shims 49 is to induce a preliminary deflection of beam 7. Such preliminary deflection is brought about by the weight of the beam, is as a general rule symmetrical in nature, and, if shims 49 are located as shown and described, is of greatest extent at end stations 2 and 6. Depending on the stations, this preliminary deflection is augmented in greater or less degree by the clamping action which results from moving clamping arms 30 into upright position and applying clamping pressure by forcing rams 25, cross heads 26 and clamping arms 30 downwardly as previously described. The net result is that flange 7b of beam 7 is held firmly in place, with the beam subject to the stresses so developed, during the sequence of flame-cutting and cooling operations; that is to say, until after torch carriage 8 has moved from the right-hand end to the left-hand end of beam 7 as shown in Figures 1 and 2 and the beam has again attained or approached atmospheric temperature.

When its flame-cutting and quenching function has been accomplished, torch carriage 8 moves off beam 7 onto run-off device 9, whereupon clamping pressure can be released and the movable parts allowed to return to their original retracted position. If, as in the preferred arrangement, torch carriage 8 departs from the conventional construction shown in Anderson Patent 2,270,242 by including means for quenching, the beam may be removed practically immediately upon completion of the steps of flame-cutting and quenching; if not, it will generally be desirable to allow the beam to cool to room temperatures before releasing it from the clamping pressure under which it is held during flame-cutting. Elaboration of the torch carriage to provide means for quenching, although not necessary, affords an additional advantage in that it gives rise to a product that is quench-hardened where the excess material is cut away from the top flange.

By way of illustration of how the invention may be employed in practice, a 20-foot H-beam having a web measuring 6¼ inches; i. e., a standard beam of symmetrical section, may advantageously be mounted, pre-stressed, flame-cut, quenched and brought to room temperature on apparatus of the type illustrated in the drawings employing a cooperating torch-carriage moving at a speed of 12 to 15 inches per minute; e. g., 13 inches per minute. In a typical case characterized by negligible overhang at the ends but making use of five equally spaced stations, shims need be employed only at the middle and the two immediately adjacent stations, the shims at the middle station having a height of 1⅞ inches and those at each of the two adjacent stations having a height of 1$\frac{7}{16}$ inches. The product will be a rail; i. e., a product of unsymmetrical section, having a slight convexity or downward bowing of the ends as seen from the side.

Although a slight convexity ("crown") is usually desired and is provided in the foregoing and following examples, it is possible by reducing the heights of the shim stacks to obtain rails that are flat or substantially flat.

Further by way of illustration of how the invention can be employed in practice, a rail 25 feet long having a web measuring 6½ inches can advantageously be flame-cut, quenched, and brought to room temperature while clamped in place on a stand similar to that illustrated in Figures 1 and 2 in which the stations are equally spaced and an overhang of 2 feet 3 inches is provided at each end of the stand. In such case, shims to a height of 2½ inches may be employed at the middle station, shims to a height of 2⅛ inches at the two adjacent stations, and shims to a height of 1⅛ inches at the two end stations. With an installation of the kind described, a cutting speed of 13 inches per minute may be used.

In a longer stand using the same cutting speed but a larger number of unequally spaced stations, four on each side of a center station at which no shims were used, shims were employed as below indicated:

Station A—$\frac{5}{16}$ inch
Station B—1$\frac{5}{16}$ inches
Station C—2$\frac{1}{16}$ inches
Station D—2$\frac{9}{16}$ inches
Station E—None
Station F—2⅝ inches
Station G—2$\frac{1}{16}$ inches
Station H—1$\frac{5}{16}$ inches
Station I—$\frac{5}{16}$ inch The above figures are for a beam 40 feet long having a 10-inch web which is allowed to overhang the end stations by 1½ feet.

It is obvious that numerous modifications may be made in the apparatus above described, as well as in the process carried out therewith. For example, the shims may be replaced by built-in jacks, adjustable screws, or other supports mounted on or projecting upward through work plates 18 into contact with flange 7b of beam 7. It is not necessary that, as hereinabove contemplated, clamping arms 30 be loosely related or unconnected to yoke 39, for it is entirely possible and in some cases may be desirable to connect clamping arms 30 to yoke 39 or links 31. Other changes in the apparatus, by way of simplification and by way of elaboration, will suggest themselves to those skilled in the art.

Similarly, the process carried out with the aid of the apparatus need not necessarily be a cutting process but may, if desired, be a welding or similar operation involving the possibility of distortion of the beam as a result of localized heating. If desired, the beam may be clamped in place before the intended deflection is developed in it, reversing the normal order of two of the steps involved in the practice of the process. It is not necessary that the induced deflection, whether or not augmented by clamping the beam, be such as to compensate precisely for the concavity that would otherwise be expected to result, for the parts may be so related as to leave a slight bowing, either concave or convex, where the use to which the product is to be put may be served by the presence of such bowing in the rail.

It is intended that the patent shall cover, by suitable expression in the appended claims, whatever features of patentable novelty reside in the invention.

What is claimed is:

1. The method of making a rail from a double-flanged structural beam having a web extending transversely between the flanges comprising the steps of positioning the beam on one of its two flanges with the web extending substantially vertically; developing a preliminary deflection in the beam, the deflection being such that the beam is bowed upwardly in the middle and downwardly at its ends; augmenting the deflection so developed by clamping the beam in position, the clamping pressure being applied to the flange on which the beam is resting; flame-cutting the unclamped flange along a path paralleling the web of the beam; cooling to harden the flame-cut portion of the unclamped flange; and, after cooling, releasing the clamping pressure and removing the beam.

2. A method as in claim 1 in which the beam is cooled to atmospheric temperatures before the clamping pressure is released.

3. A method as in claim 2 in which the step of cooling to atmospheric temperatures is hastened by quenching.

4. A method as in claim 3 in which the step of cooling is hastened by liquid quenching.

J. BENTLY FORKER.

REFERENCES CITED

The following references are of record in the file of this patent:

UNITED STATES PATENTS

| Number | Name | Date |
|---|---|---|
| 357,160 | Toepfer | Feb. 1, 1887 |
| 1,261,792 | Drewes | Apr. 9, 1918 |
| 1,496,531 | Ewing | June 3, 1924 |
| 1,658,064 | Stine | Feb. 7, 1928 |
| 2,187,731 | Davis | Jan. 23, 1940 |
| 2,208,121 | Davis | July 16, 1940 |
| 2,270,242 | Anderson | Jan. 20, 1942 |
| 2,326,906 | Walters | Aug. 17, 1943 |
| 2,464,351 | Shorter | Mar. 15, 1949 |
| 2,493,033 | Russell et al. | Jan. 3, 1950 |

FOREIGN PATENTS

| Number | Country | Date |
|---|---|---|
| 561,586 | Great Britain | May 25, 1944 |
| 620,516 | Great Britain | Mar. 25, 1949 |

OTHER REFERENCES

International Acetylene Association publication, Sect. XIII, "Flame-Hardening by the Oxy-Acetylene Process," 1940, page 11 of 15 pages.

Hartley, treatise in The Iron Age, November 14, 1940, pages 50, 51 (complete article, pages 48–52).